United States Patent [19]

Katsura et al.

[11] Patent Number: 5,706,034
[45] Date of Patent: Jan. 6, 1998

[54] GRAPHIC PROCESSING APPARATUS AND METHOD

[75] Inventors: Koyo Katsura, Hitachiota; Yasushi Fukunaga; Ryo Fujita, both of Hitachi; Kazuyoshi Koga; Takehiko Nishida, both of Katsuta, all of Japan

[73] Assignee: Hitachi, Ltd., Tokyo, Japan

[21] Appl. No.: 358,988

[22] Filed: Dec. 19, 1994

Related U.S. Application Data

[63] Continuation of Ser. No. 735,947, Jul. 25, 1991, abandoned.

[30] Foreign Application Priority Data

Jul. 27, 1990 [JP] Japan .................................. 2-197929

[51] Int. Cl.⁶ ............................................ G09G 5/00
[52] U.S. Cl. ......................... 345/201; 345/185; 395/508
[58] Field of Search .............................. 345/188, 190, 345/193, 200, 185, 197, 196, 201; 395/162–166, 501, 503, 507, 508, 509, 511, 512

[56] References Cited

U.S. PATENT DOCUMENTS

| 4,462,028 | 7/1984 | Ryan et al. | 340/799 |
| 4,562,435 | 12/1985 | McDonough et al. | 340/798 |
| 4,594,587 | 6/1986 | Chandler et al. | 340/750 |
| 4,737,780 | 4/1988 | Ishii | 340/750 |
| 4,757,312 | 7/1988 | Asai et al. | 340/750 |
| 4,803,475 | 2/1989 | Matsueda | 340/750 |
| 4,845,661 | 7/1989 | Shimada | 340/798 |

FOREIGN PATENT DOCUMENTS

| 59-131979 | 7/1984 | Japan . |
| 63-91787 | 4/1988 | Japan . |
| 1265348 | 10/1989 | Japan . |

OTHER PUBLICATIONS

Y. Yao, "Unified Memory Architecture Cuts PC Cost", Microprocessor Report, vol. 9, No. 8, pp. 5–9, Jun. 19, 1995.
Nikkei Electronics, No. 653, pp. 16–17, Jan. 15, 1996.

*Primary Examiner*—Xiao Wu
*Attorney, Agent, or Firm*—Antonelli, Terry, Stout & Kraus, LLP.

[57] ABSTRACT

A graphic processing apparatus for generating, displaying or printing characters and graphic data. A successive column access is used in which a row address is designated for access to a memory and data in different column addresses within the designated same row address are successively accessed and buffer means for buffering a series of data between an access by a processor and an access to a memory is provided. A program and image information for display are stored in a main memory. A frame buffer and the main memory are integrally configured simply and small in size.

17 Claims, 9 Drawing Sheets

IMAGE AS SYSTEM MEMORY

TWO-DIMENSIONAL IMAGE OF 8 BITS / PIXEL

TWO-DIMENSIONAL IMAGE OF 32 BIT / PIXEL

TWO-OPERAND BITBLT

THREE-OPERAND BITBLT

GENERATION OF STRAIGHT LINE

SHADING

GRAPHIC PROCESSING APPARATUS AND METHOD

This application is a continuation of Ser. No. 07/735,947, filed Jul. 25, 1991, now abandoned.

BACKGROUND OF THE INVENTION

The present invention relates to a graphic processing apparatus for generating, displaying or printing characters and graphic data, and more particularly to a graphic processing apparatus including a frame buffer provided integrally in a main memory to store display pixel data and a graphic processing method of generating characters and graphic data.

A graphic processing apparatus for generating and displaying characters and graphic data includes a frame buffer for storing data corresponding to pixels on a display screen. In order to display a stable picture on the display screen, it is necessary to read data from the frame buffer successively repeatedly in synchronism with the raster scanning of a display unit. In order to realize the display function, the frame buffer is generally used as a memory independently of a main memory.

Japanese Patent Unexamined Publication JP-A-59-131979 discloses, as a special purpose memory suitable for the frame buffer, a graphic dual-port memory having a serial output port in addition to a random access port. The use of the memory can make short the display access and hence improve the drawing performance (graphic generation). However, thereafter, even if the integration density of the memory is increased, a constant number of memories are required to obtain a fixed display output. Accordingly, there is a problem that the high integration is not utilized in a lower capacity area of the memory effectively.

Further, there are Japanese Patent Unexamined Publications JP-A-63-91787 and JP-A-1-265348 as relevant references.

Heretofore, there is a problem that the access method which is complicated and low in a speed must be utilized in order to cope with various applications. Further, there is a problem that the high integration of the graphic dual-port memory capable of being used as the high-speed frame buffer is not utilized for a small capacity memory.

SUMMARY OF THE INVENTION

It is an object of the present invention to provide a graphic processing apparatus and method in which a frame buffer and a main memory are configured integrally and a high-speed and standard dynamic memory with simple configuration is used to effectively utilize the integration degree of the memory.

Further, it is another object of the present invention to provide a graphic processing apparatus in which a standard dynamic RAM can be used to make high-speed drawing with a high-integrated and small configuration.

In the present invention, successive column access for a memory is used in which a row address is designated and then data in different column addresses within the designated row address are successively accessed, and there is provided means for buffering a series of data between the access by a processor and the access to the memory. Display graphic information is also stored in a main memory in addition to a program and data.

Further, in order to achieve the high-speed drawing, there is provided a graphic processor which performs the successive column access for a dynamic memory. The number of times of the column accesses is varied and there is provided buffer means for temporarily storing data obtained by the column accesses.

The buffer means can absorb deviation in a timing between the access from the processor and the memory access having a higher throughput than that of the access from the processor and utilize empty memory access as display access.

Further, the graphic processor allows to the arrangement vary the number of times of the column accesses and performs the graphic processing for raster data having any length effectively.

According to the present invention, since the frame buffer and the main memory can be configured integrally, it can be configured simply and small regardless of the high-speed operation. For example, 32 to 64 16-Mbit memory elements are used to operate a processor having a performance of 100 MIPS or more effectively and 1280×1024 pixels can display 16 million colors (8 bits for each of R, G and B).

Further, according to the present invention, system bus access (access by operation processing means) and display access (access by display control means) can be controlled preferentially in accordance with its priority order and waste of the memory access can be eliminated.

DESCRIPTION OF THE PREFERRED EMBODIMENTS

Embodiments of the present invention are now described in detail with reference to the accompanying drawings.

Figure 1:
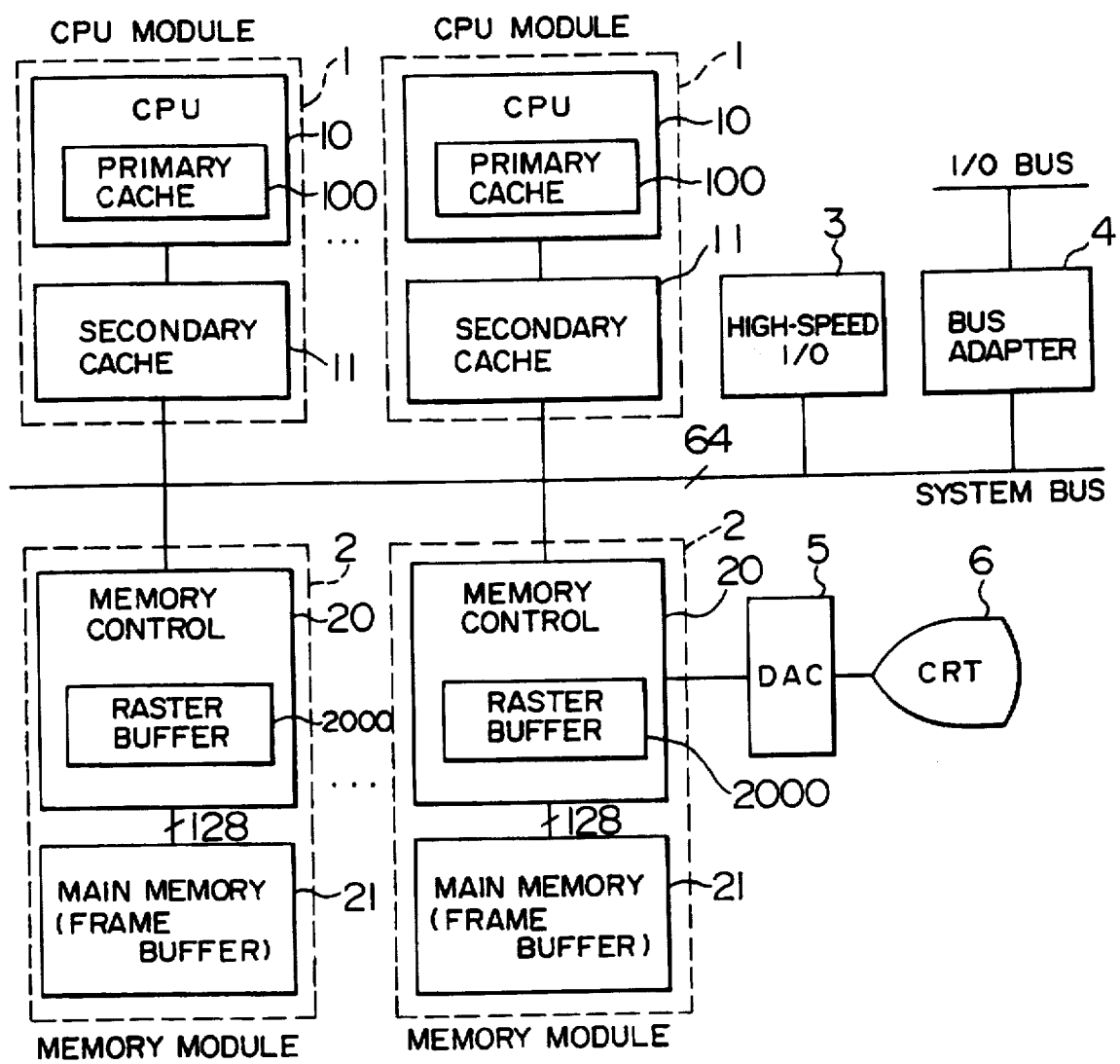
FIG. 1 is a block diagram showing a system configuration of an embodiment of the present invention.

FIG. 1 shows an embodiment of the present invention, which comprises one to a plurality of CPU modules 1, one to a plurality of memory modules 2, a high-speed I/O unit 3, a bus adapter 4, a DAC (D/A converter) 5 and a CRT 6. The CPU modules 1, the memory modules 2, the high-speed I/O unit 3 and the bus adapter 4 are connected to each other through a high-speed system bus having a width of 64 bits. The CPU module 1 includes a CPU 10 for performing an operational process and a large-capacity secondary cache 11 connected to the CPU externally. The CPU 10 is of one-chip LSI and includes a primary cache 100, a floating-point arithmetic mechanism (not shown) and a memory control unit (not shown). A CPU having a performance of 100 MIPS (the performance index representing that millions instructions per second can be executed) is used in the embodiment. The memory module 2 includes a memory controller 20 and a main memory 21 including frame buffer function. The memory controller 20 includes a raster buffer 2000 for buffering data and controls the access to the main memory and output of display data. Description will be made by way of example on the assumption that the main memory 21 has 32 16-Mbit (four 4-Mbit memory devices) memory chips. The high-speed I/O unit 3 connected directly to the high-speed system bus is a high-speed network controller, a high-speed disk controller or the like. The bus adapter 4 is to connect the high-speed system bus to a low-speed I/O bus. Connected to the low-speed I/O bus are a printer, a key board, a mouse, an external memory such as a disk and a controller for a network or the like. The DAC 5 includes a color pallet for converting a color code and a D/A converter for converting a digital color video signal to an analog video signal. The CRT 6 is of a raster scan type display unit. In the embodiment, a display unit capable of displaying various colors with any resolution can be employed. However, it is assumed that a display unit having 1280×1024 pixels is used in the embodiment unless otherwise specified. Further, in the embodiment, the CRT 6 is connected as an output unit of characters and graphic data, while it is needless to say that the present invention can be applied to any other output unit (for example, a printer) similarly.

Figure 2:
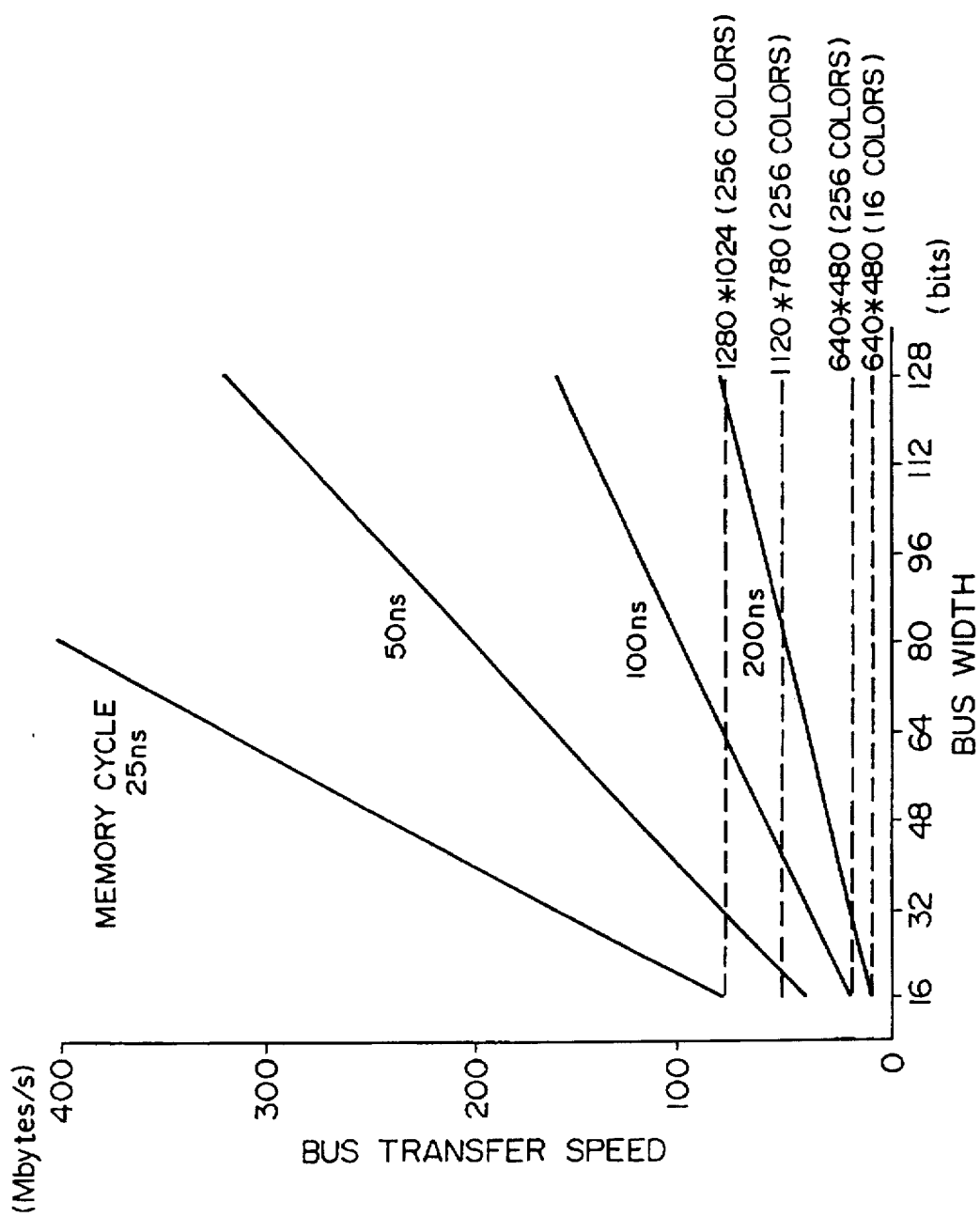
FIG. 2 is a diagram illustrating bus transfer speed.

FIG. 2 shows a relation between a bus width and a speed of a memory and a bus transfer speed. Heretofore, a cycle time of the random access to a dynamic memory generally requires about 200 to 400 ns. For example, if the memory cycle is 200 ns and the bus width is 32 bits, the bus transfer speed of 20 MB/S is obtained. On the other hand, when 256 colors are displayed simultaneously on a display unit having, for example, 1280×1024 pixels, the throughput of at least about 80 MB/S is required for reading of data to be displayed. More particularly, in a conventional general memory design, the throughput necessary for the display is much larger than that of the accesses of a processor to a memory, and this is a reason that the special purpose buffer memory is required. Accordingly, as in the embodiment of FIG. 1, when the performance of the processor exceeds 100 MIPS, the performance capable of supplying programs and data from the memory with the throughput of several hundreds MB/S is required in order to operate the processor effectively. That is, a higher throughput for the accesses by the processor is necessarily required as compared with the memory access for the display. This means the possibility that part of the accesses by the processor can be assigned to the display. For example, if the memory cycle is 25 ns, there can be attained the transfer rate of 320 MB/S with the bus width of 64 bits and the transfer rate of 640 MB/S with the bus width of 128 bits.

Figure 3:
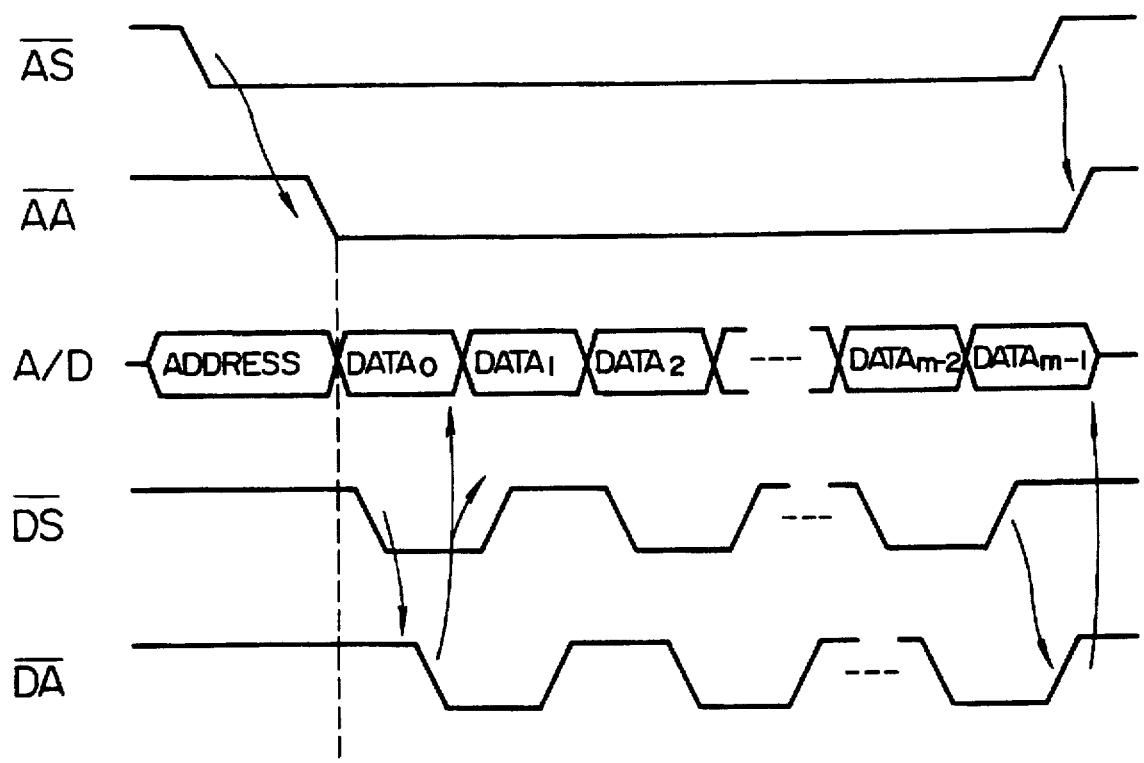
FIG. 3 is a diagram illustrating a system bus.

FIG. 3 illustrates operation of the high-speed system bus. In order to increase the performance, m blocks are transferred as a unit. When an application of an address to an A/D (address/data) bus is represented by a falling edge of an AS (address strobe) from a bus master, the transfer cycle is started. When a response is returned by a falling edge of AA (address acknowledge) from a slave side, data is transferred. The transfer of data is controlled by control signals of DS (data strobe) and DA (data acknowledge). Both of falling edges and rising edges of the DS and DA are significant, and the DS is used to inform existence of data and the DA is used to inform a response thereto. In this manner, the high-speed operation is attained by transferring data in a block. For example, when one transfer cycle of data is 25 ns, the transfer rate of 320 MB/S is obtained in a peak with the system bus of 64 bits.

Figure 4:
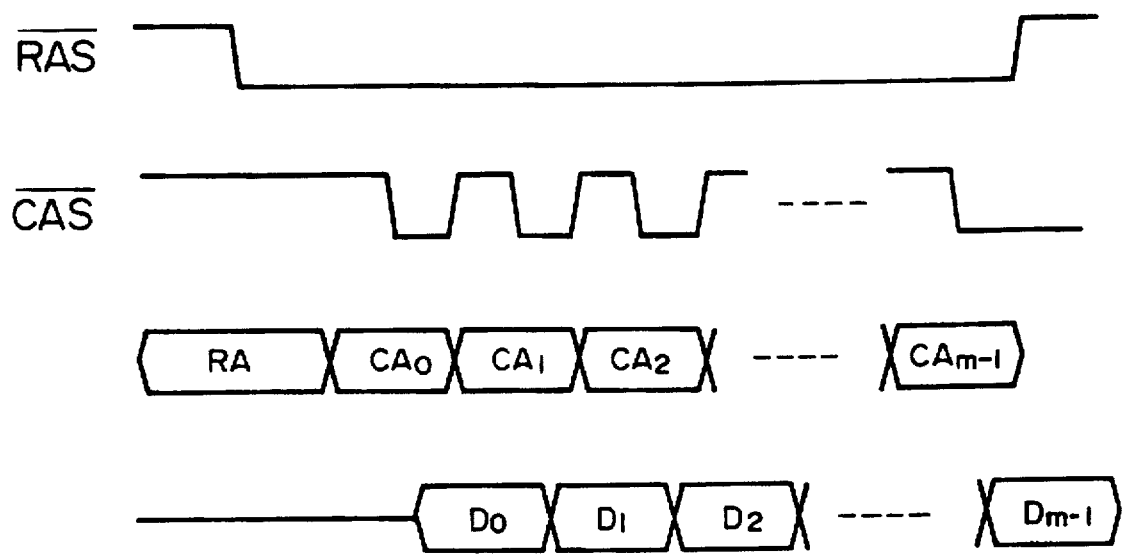
FIG. 4 is a diagram illustrating a memory bus.

FIG. 4 illustrates the high-speed memory access method. A read cycle by a page mode is shown by way of example. When a RA (row address) on address lines is supplied in a memory device in response to a falling edge of a RAS (row address strobe), reading of one line from a memory cell is started. Then, a CA (column address) on the address lines is supplied in the memory device in response to a falling edge of a CAS (column address strobe) and data designated by the CA of the one-line data designated by the RA is produced on a data line. Thereafter, the CA is changed and data for a different column address in the same row is successively read in response to the falling edge of the CAS. The page mode can make access only by the application of the CA and accordingly the considerably high-speed operation can be attained as compared with the conventional random access in which both of RA and CA are supplied every time. Consequently, when the cycle time of the page mode is, for example, 25 ns, the transfer rate of maximum 640 MB/S is attained with the data bus width of 128 bits.

Figure 5:
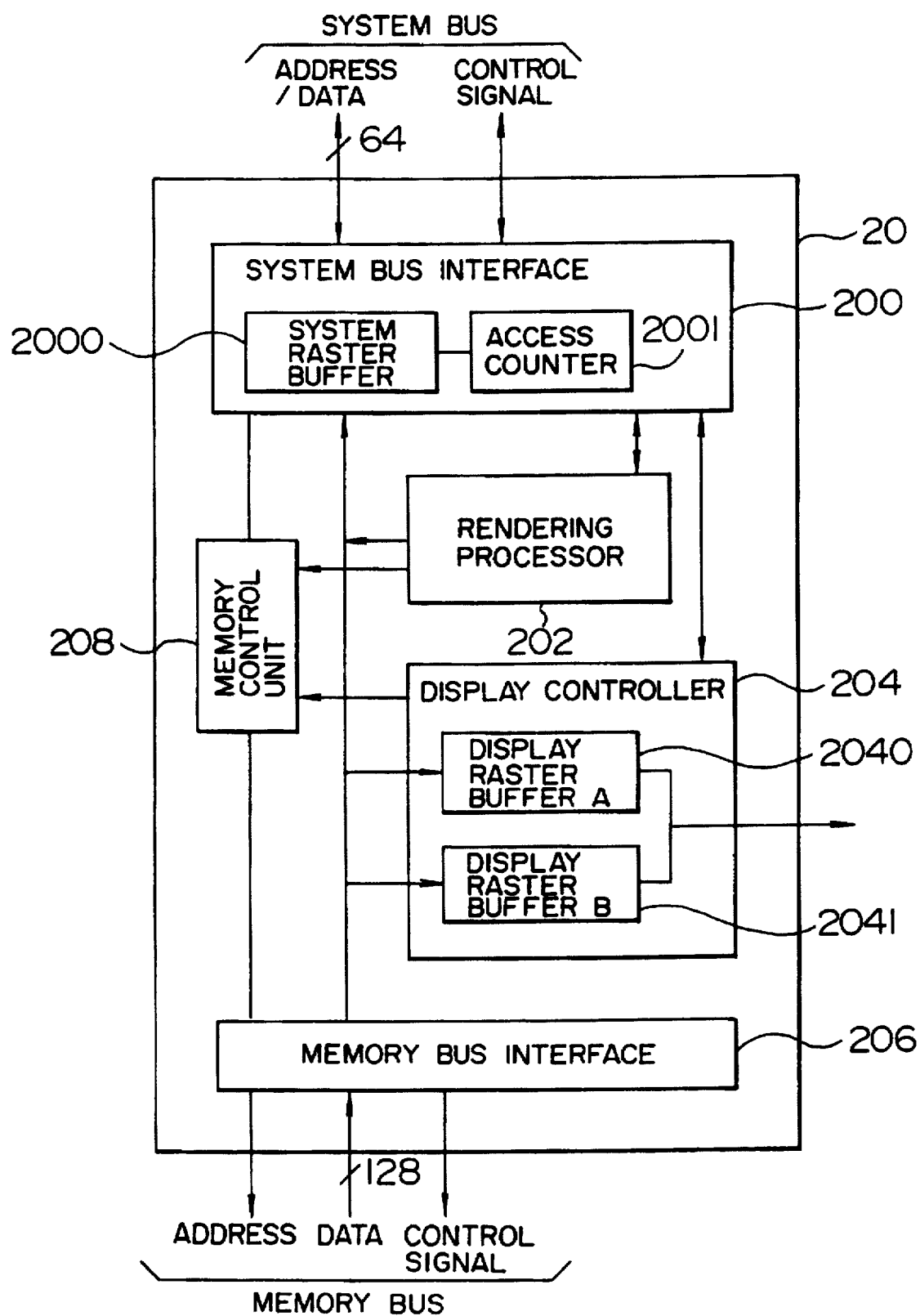
FIG. 5 is a block diagram showing an internal configuration of a memory controller of FIG. 1.

Referring now to FIG. 5, an internal configuration of the memory controller 20 according to the present invention is described. The memory controller 20 includes a system bus interface 200, a rendering processor 202, a display controller 204, a memory bus interface 206 and a memory control unit 208. The system bus interface 200 serves to interface with the system bus, and includes a system raster buffer 2000 and an access counter 2001. The system raster buffer 2000 is to temporarily store data transferred between the system bus and the memory. In the embodiment, the system raster buffer 2000 has a capacity of 256 bytes and the transfer of data is made within the range of the memory capacity by the number of times designated by the access counter. Particularly, in the embodiment, since the throughput of the memory bus is higher than that of the system bus, the system raster buffer 2000 is indispensable as means for absorbing a difference in a speed between the memory bus and the system bus. The access counter 2001 is to control the input and output operation of the system raster buffer 2000 in response to the access of the system bus or the memory bus, and an optimum value determined by a line size of the cache is previously set in the access counter 2001 as the number of times of the block transfer (maximum 32 times) to the system bus. Part of the system raster buffer 2000 and the access counter 2001 may be configured by an FIFO (First-In First-Out). The rendering processor 202 is to control drawing and has the basic drawing function such as generation of straight lines, generation of painting data of horizontal lines and control of bit block transfer. Further, the rendering processor 202 has the Z comparison function for a shading process for effecting interpolation for smooth brightness and elimination of a shaded portion. The display controller 204 is to control display for the display unit, and includes a display raster buffer A 2040 and a display raster buffer B 2041. The display controller 204 has a programmable function capable of coping with various display units having different resolutions of display screens and different numbers of colors to be displayed and performs generation of a synchronous signal and reading of display data in accordance with a display unit. Each of the display raster buffers A and B 2040 and 2041 has a memory capacity of 6 Kbytes and can store 2048 pixels each including eight bit-data for each of R, G and B. More particularly, since each of two buffers can store the display data for one raster, one of the buffer is used for display during the display period of one raster and the other is used to store the next raster data. In the embodiment, each of the buffers stores data for one raster of the display unit, while the data for one raster may be divided into a partial data unit of the raster if the capacity of the buffers is small. In this case, however, since the reading access of the display data is concentrated within the display period and is not made during the retrace period, there is a problem that the load balance to the system bus is different in the display period and the retrace period. In other words, if data for one raster can be stored in the display raster buffer, the reading access of the display data can be dispersed into the period including the horizontal retrace period and the display period. The function of the display raster buffers can be replaced by FIFO. The memory bus interface 206 serves to interface with the memory and performs multiplexing of the address for the dynamic RAM and generation of memory control signals. The memory control unit 208 performs the same address conversion as that included in the CPU 10 and converts a virtual address supplied from the rendering processor 202 and the display controller 204 into a physical address. The physical address supplied from the system bus is sent to the memory bus as it is. If the memory control unit 208 is not provided, the rendering processor 202 and the display controller 204 uses the physical address to control the address. Further, since there is a problem of the synchronization with the display screen, the display address is used as the physical address and the rendering processor 202 may control a logical address.

Figure 6A:
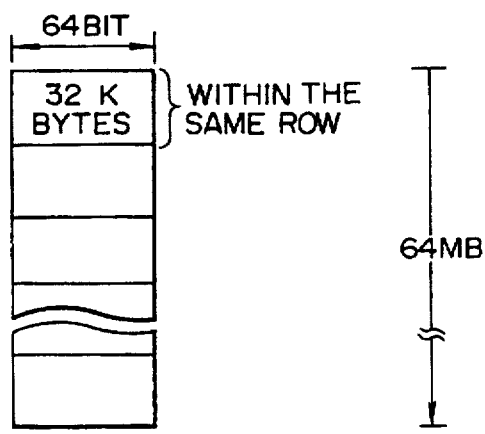
FIG. 6 illustrates memory space.
Figure 6B:
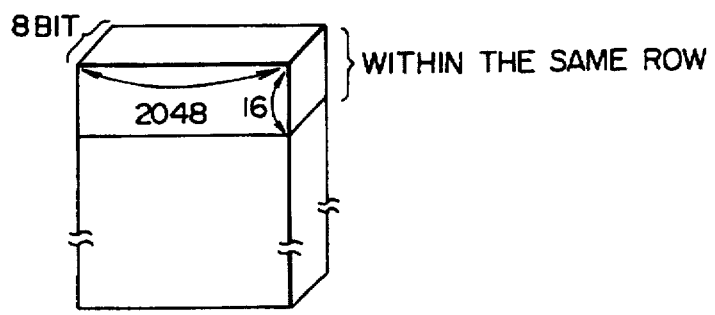
Figure 6C:
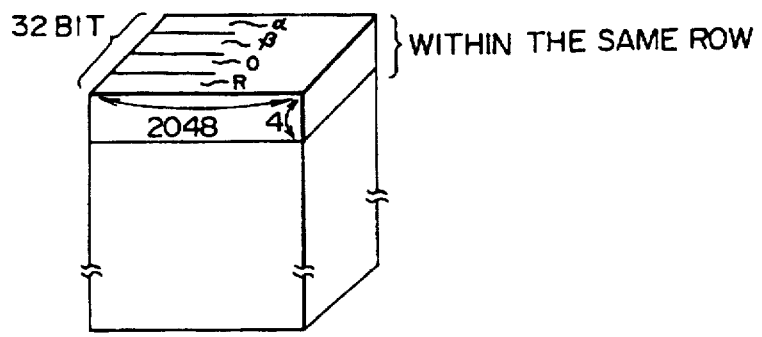

FIG. 6 illustrates a logical image of the main memory 21. In the embodiment, the main memory 21 is a single memory space as a hardware and accordingly can be treated logically freely by a software so that various flexible configurations can be formed. FIG. 6(a) shows an image of the memory when accessed by the CPU and the memory has a linear space having a data width of 64 bits. A memory area for 32 Kbytes of the memory has the same row address and can be accessed by the page mode. FIG. 6(b) illustrates an image as a frame buffer with 8 bits/pixel used for display of 256 colors. A width thereof is composed of 2048 pixels in FIG. 6(b), while any other configuration with different width may be utilized. In this example, the page mode access can be effective in the area of a width of 2048 pixels by a depth of 16 pixels. FIG. 6(c) illustrates an example of a frame buffer of 32 bits/pixels with 8 bits for each of R, G, B and $\alpha$ (coefficient data used for semitransparent expression). In this case, the page mode access can be effective in the area of a width of 2048 pixels by a depth of 4 pixels. Various configurations may be available in addition to the above configurations. For example, a Z plane having a Z value of 32 bits is treated by the same image as FIG. 6(c). Further, the main memory 21 can store the above various data mixedly and can be applied to various uses flexibly.

Figure 7:
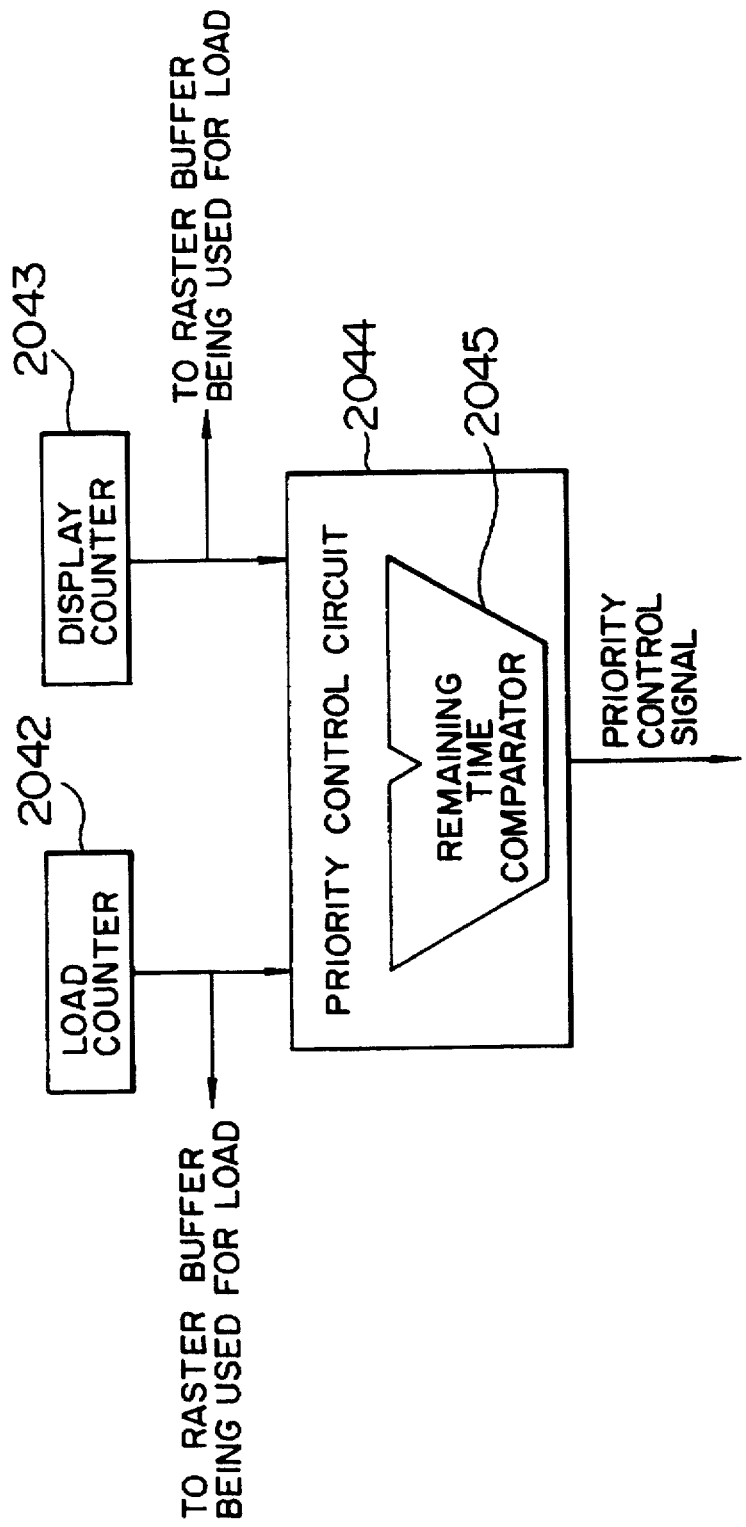
FIG. 7 is a diagram illustrating a priority control mechanism in a display controller of FIG. 5.

FIG. 7 shows a configuration of a priority control mechanism in the display controller 204, which includes a load counter 2042, a display counter 2043, and a priority control circuit 2044. The load counter 2042 is to control operation of one of the display raster buffers A2040 and B2041 being used for reading the display data. The display counter 2043 is to control progress of the other of the display raster buffers being used for the display. Since the display raster buffer operates in synchronism with the display, the reading of the display data must be finished until the processing of the raster buffer being used for the display is completed. Accordingly, the priority control circuit 2044 judges whether a remaining time is sufficient for reading of a remaining display data or not. More particularly, a remaining time comparator 2045 compares a time required to read the remaining display data with the remaining operation time of the display raster buffer being used for the display on the basis of information of the load counter 2042 and the display counter 2043. When there is a sufficient time for reading, the priority of access for the display is reduced, while when the remaining time is short, the remaining time comparator 2045 produces a priority control signal for increasing the priority of the access for the display.

Figure 8:
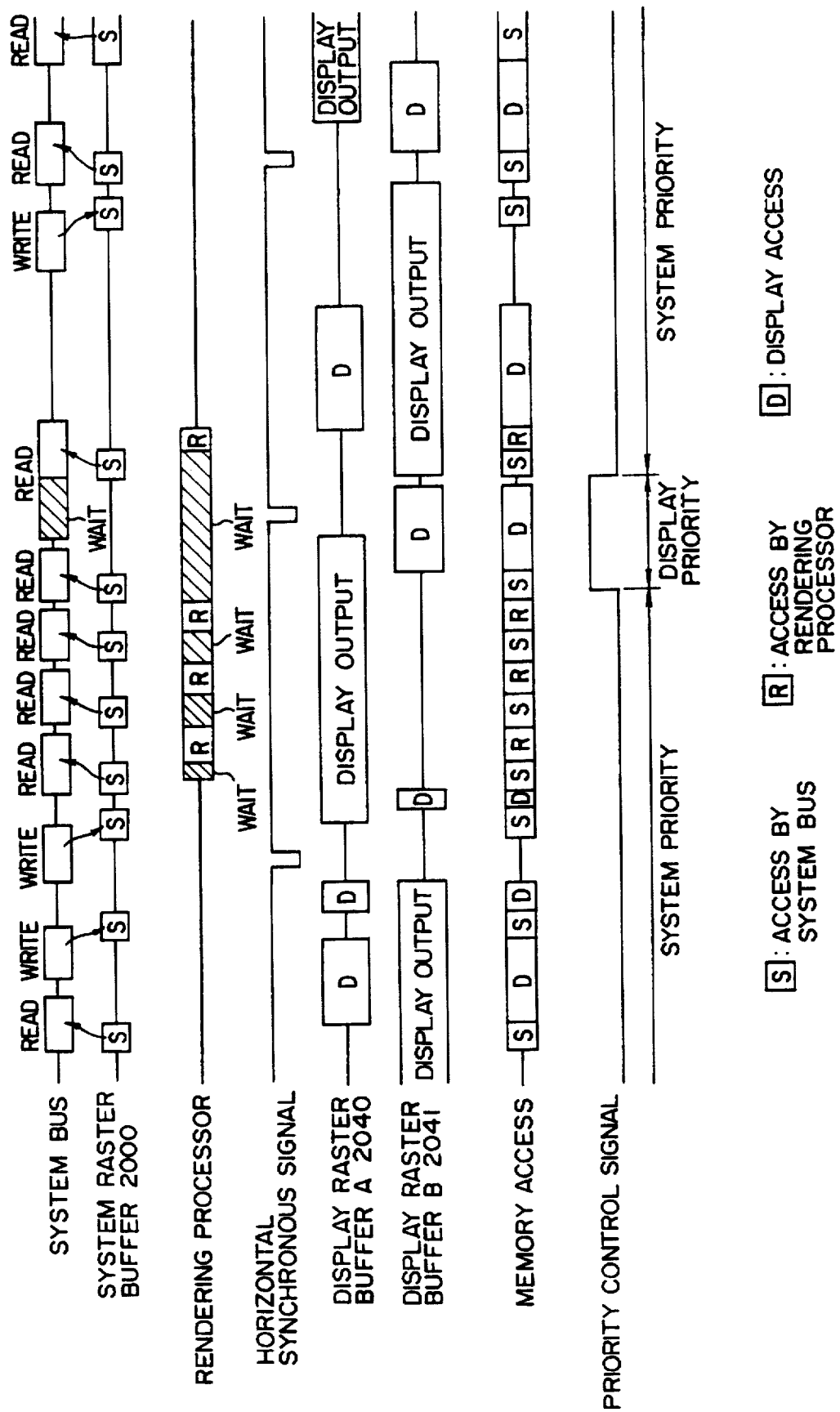
FIG. 8 illustrates memory access operation.

FIG. 8 shows a flow of operation of each portion. The priority order for the normal access is ① the system bus, ② the rendering processor and ③ the display access, while the priority order in the condition of the display priority is ① the display access, ② the system bus and ② the rendering process. "S" in the memory access represents the access by the system bus, "R" represents the access by the rendering processor, and "D" represents the display access. Boxes in the memory access represent a series of page mode accesses. The reading access from the system bus reads data from the memory through the system raster buffer 2000. Since the memory access is faster than the system bus, data is temporarily stored in the system raster buffer 2000 and then is successively outputted to the system bus. The writing access from the system bus is stored in the memory after storing in the system raster buffer 2000. The display raster buffers A2040 and B2041 are used for display alternately in synchronism with the horizontal scanning. Since the access by the rendering processor 202 has a lower priority order than the system bus, a waiting state occurs when the system bus is accessed and used. When the access of the system bus and the access by the rendering processor are concentrated, the display access is driven after one raster time, and when the remaining time is short in this state, the priority is changed to the display priority so that the display access is forcedly implemented. In this case, there is a case where a wait occurs in the access of the system bus.

Figure 9:
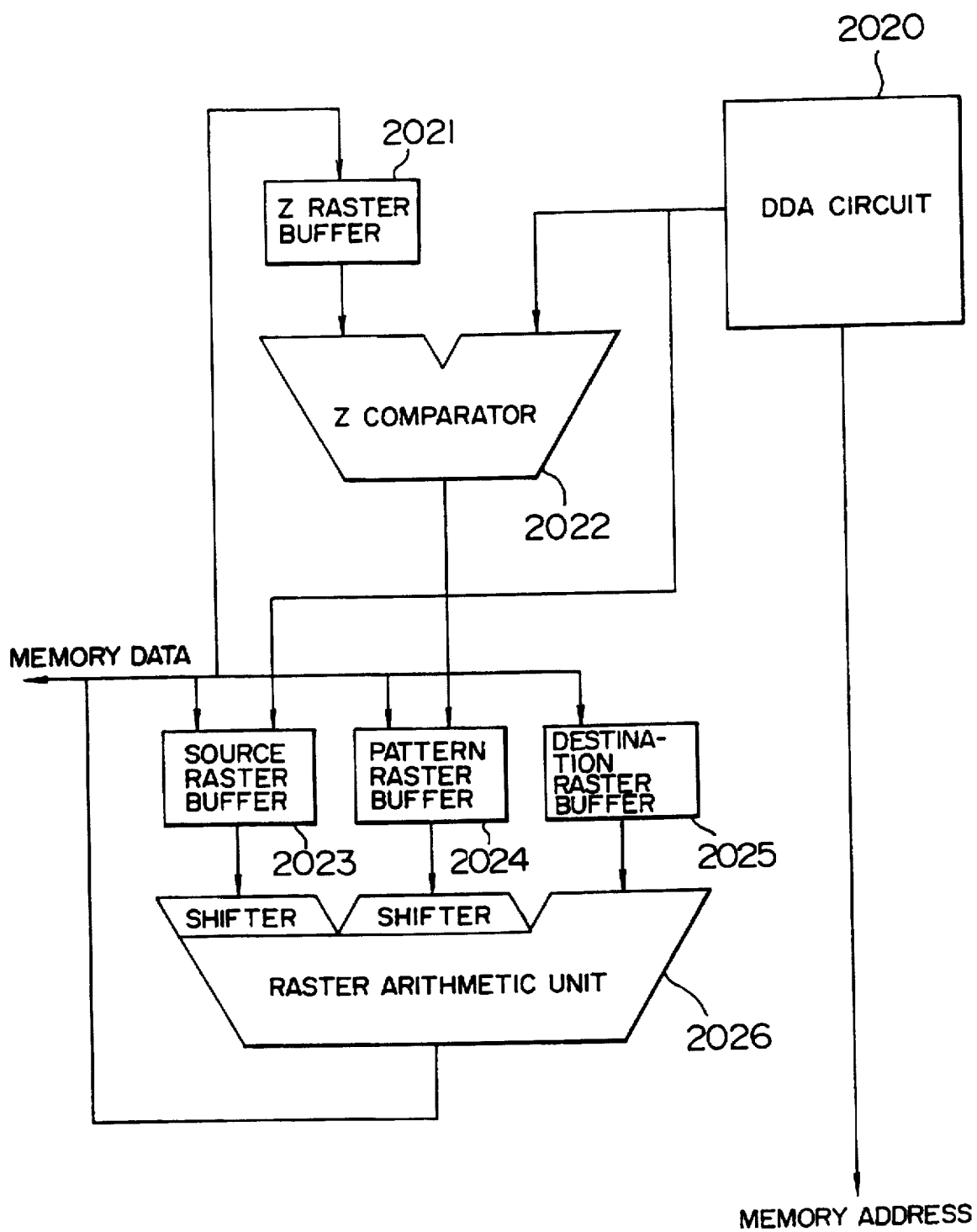
FIG. 9 is a block diagram showing an internal configuration of a rendering processor of FIG. 5.
Figure 10A:
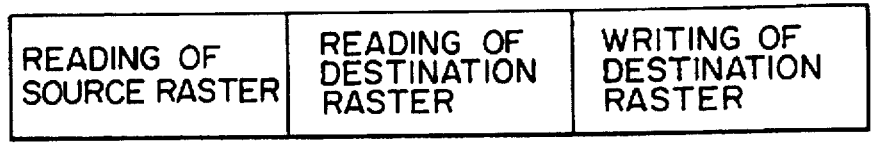
FIG. 10 illustrates operation in the drawing process.
Figure 10B:
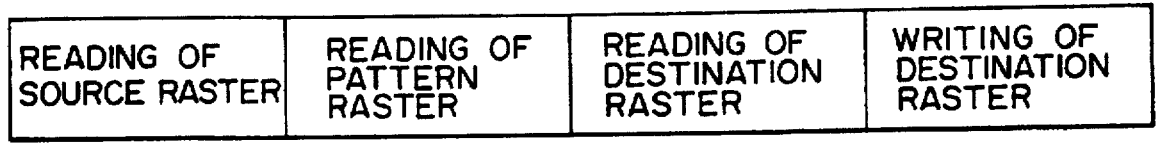
Figure 10C:
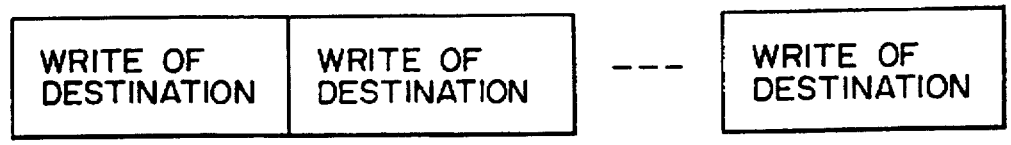
Figure 10D:
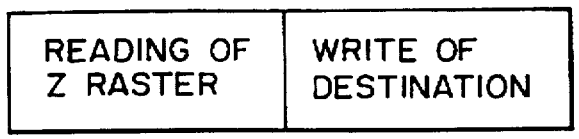

FIG. 9 shows a configuration of the rendering processor 202, which includes a DDA circuit 2020, a Z raster buffer 2021, a Z comparator 2022, a source raster buffer 2023, a pattern raster buffer 2024, a destination raster buffer 2025 and a raster arithmetic unit 2026. The DDA circuit 2020 performs generation of coordinates upon generation of straight lines, calculation of brightness for R, G and B in the interpolation of the brightness and calculation by interpolation of Z value, and produces an address for each pixel. The Z raster buffer 2021 stores data for a series of raster (a plurality of pixels continuing horizontally or its plurality of groups) of Z value read from the memory and stores a Z value corresponding to any designated length of raster. The Z comparator 2022 compares data of the Z raster buffer 2021 with the Z value interpolated by the DDA circuit and its comparison result is stored in the pattern raster buffer 2024. The source raster buffer 2023 stores any length of raster data of a source of the bit block transfer (BITBLT) operation. In the case of generation of straight lines, the buffer stores the drawing line information and the drawing information. In the case of shading operation, the buffer stores a brightness value produced by the DDA circuit 2020. The pattern raster buffer 2024 stores raster data of a pattern for the BITBLT operation and mask data produced from the Z comparator upon elimination of shading plane. The destination raster buffer 2025 temporarily stores read data of a destination in the BITBLT operation. The raster arithmetic unit 2026 executes the BITBLT operation such as color operation and various logic operation in accordance with a predetermined operation mode. The embodiment is characterized in that the memory is accessed in the page mode in a raster block unit at a high speed by providing the rater buffers storing any raster data so that a large amount of data is processed at a high speed.

FIG. 10 shows procedures of the memory accesses for some examples of processes. In FIG. 10, one box represents a series of accesses for the raster block capable of being accessed by the page mode. During the actual memory access, when the system bus access or the display access is produced, the waiting state occurs and it is divided into a plurality of page mode access groups and implemented. In the two-operand BITBLT of FIG. 10(a), the writing of the destination is executed subsequently to the reading of the source and destination. FIG. 10(b) is different from FIG. 10(a) in that the reading of the pattern raster data is added. FIG. 10(c) shows generation of straight lines, and the writing is executed for each unit of a series of raster blocks. For example, in the memory configuration shown in FIG. 6(b), generation of a horizontal line can be executed by a single writing of a raster block. In the case of a vertical straight line, the raster block is different every 16 pixels and accordingly the writing can be effected in its unit. However, it is needless to say that when the raster buffer has a smaller capacity than 32 KB the access unit is restricted by its capacity size. When the capacity of the raster buffer is small, the efficiency of the memory access can be increased correspondingly if a method of storing a column address together with the raster block can be adapted or an oblong or square shape can be selected as the shape of the raster block. FIG. 10(d) shows shading, and writing of the destination data is made after reading of the Z raster. When operation for the destination data is specified, there is a case where reading of the destination is made before writing of the destination.

As described above, in the embodiment, the high-speed drawing can be executed by the rendering processor shown in FIG. 9 in combination with the page mode access. The embodiment is configured by using the standard dynamic memory, while it is not necessarily required that the configuration of FIG. 9 is combined with the dynamic memory and it may be combined with an image dual-port memory, for example. With the configuration of the embodiment, the memory can be small and when the image dual-port memory is used, reduction of the performance by the display access is small. Further, in the embodiment, the page access mode has been described by way of example, while it is needless to say that the similar description can be made if any other similar mode (nibble mode or static column mode) is used.

We claim:

1. A graphic processing apparatus comprising: a processor for executing an operation process; a display for displaying pixel data; a memory for storing, in an integrated manner, at least a program necessary for operation of said processor and a plurality of said pixel data produced by said processor;

a display controller having a first display buffer and a second display buffer, each for buffering at least a raster portion of said pixel data stored in said memory, said display controller alternately using during subsequent display cycles, one of said first display buffer and said second display buffer as a write buffer for writing a next pixel data thereto from said memory, while using an opposite one of said first display buffer and said second display buffer as a read buffer for reading a current pixel data therefrom to said display;

a comparator for comparing a time required to read a remaining said next pixel data from said memory into said write buffer with a remaining operation time required to display a remaining content of said read buffer; and a priority control means for controlling memory access priority based on a comparison made in said comparator, said priority control means generating a priority control signal indicating a first memory access priority value for high priority accessing of said display controller to said memory when a time required to read said next pixel data remaining in said memory means approaches said remaining operation time required to display said remaining content in said read buffer, and otherwise generating another priority control signal indicating a second memory access priority value for normal priority accessing of said display controller to said common memory.

2. A graphic processing apparatus as claimed in claim 1, wherein said memory integrally comprises both a main memory storage area for storing said program and a display storage area for storing said pixel data.

3. A graphic processing apparatus according to claim 1, further comprising a memory bus connected to said memory wherein said processor and said display controller access through said memory bus to said memory.

4. A graphic processing apparatus comprising:

a processor for executing an operation process;

a display for displaying pixel data;

a memory for storing, in an integrated manner, at least a program for executing an operation process by said processor and a plurality of said pixel data, said memory including a pair of display buffers each for holding at least a raster portion of said pixel data, a memory data supplier for supplying said current pixel data alternately stored in one of said first and second display buffer of said memory to said display; and a compare means for comparing a time required to write a remaining said next pixel data in one of said first and second display buffer with a remaining operation time to output a remaining said current pixel data from an opposite one of said first and second display buffer to said display means for providing control of priority accessing to said memory for said pixel data, so as to prioritize an access of said pixel data from said memory over a program access of said program from said memory when a time required to write a remaining said next pixel data approaches said remaining operation time required to output said current pixel data.

5. A graphic processing apparatus according to claim 4, wherein said pixel data stored in said memory is equal to or larger than at least a display capacity of said display means.

6. A graphic processing apparatus according to claim 5, wherein said memory data supplier includes buffer means for temporarily storing a series of data accessed in successive column manner by said processor.

7. A graphic processing apparatus according to claim 6, wherein a number of times of successive column accesses is varied.

8. A graphic processing apparatus according to claim 4, wherein said memory data supplier includes buffer means for temporarily storing a series of data accessed in successive column manner for supplying to said display.

9. A graphic processing apparatus according to claim 5, wherein said memory data supplier includes buffer means for temporarily storing a series of data accessed in successive column manner for supplying to said display.

10. A graphic processing apparatus according to claim 8, wherein said buffer means includes a plurality of buffers for temporarily storing a series of data accessed in successive column manner for application to said display, said plurality of buffers being connected in parallel.

11. A graphic processing apparatus according to claim 9, wherein said buffer means includes a plurality of buffers for temporarily storing a series of data accessed in successive column manner for application to said display, said plurality of buffers being connected in parallel.

12. A graphic processing apparatus as claimed in claim 4, wherein said memory integrally comprises both a main memory storage area for storing said program and a display storage area for storing said pixel data.

13. A graphic processing apparatus comprising:
   a rendering processor for controlling generation of graphic data;
   a dynamic memory for storing, in an integrated manner, both program data and pixel data generated by said rendering processor;
   a display unit including a pair of display buffers for displaying content thereof to output pixel data for at least a raster stored in said dynamic memory to a display, wherein, for subsequent display cycles, one of a first display buffer and a second display buffer of said pair of display buffers is used as a write buffer for writing a next pixel data thereto, while an opposite one of said first display buffer and said second display buffer is used as a read buffer for reading a current pixel data therefrom to said display; and,
   a control means connected with said display unit for comparing a time required to write a next pixel data remaining in said dynamic memory to said write buffer with a remaining operation time required to display a current pixel data remaining in said read buffer;
   whereby a row address is designated to said dynamic memory and data in different column addresses within said designated row address are successively accessed, and a number of times of successive column accesses is varied in accordance with a result of a comparison made in said control means to assure an integrity of a display of said pixel data on said display by prioritizing accessing of said pixel data from said dynamic memory over said program data when a time required to write a remaining said next pixel data approaches said remaining operation time to display said current pixel data.

14. A graphic processing apparatus as claimed in claim 13, wherein said dynamic memory integrally comprises both a main memory storage area for storing at least one program for controlling an operation of said graphic processing apparatus and a display storage area for storing said pixel data.

15. A graphic processing method in which pixel data to be displayed in a display unit is prepared by operation processing and stored in a memory and stored pixel data is supplied to said display unit wherein for subsequent display cycles, one of a first display buffer and a second display buffer of a pair of display buffers is used as a write buffer for writing a next pixel data thereto while an opposite one of said first display buffer and said second display buffer is used as a read buffer for reading a current pixel data therefrom to said display, and access to said memory for said operation processing and access to said memory for display are executed in accordance with a predetermined priority order among said operation processing on a data and said display data out of said memory for pixel, wherein when a time required to write a remaining said next pixel data to said write buffer approaches a remaining operation time to output said current pixel data from said read buffer to said display unit, a priority of access to said memory for display is increased over access to said memory for said operation processing in order to assure an integrity of a display of said pixel data on said display.

16. A graphic processing method according to claim 15, wherein at least an access time to said memory for said operation processing and an access time to said memory for said display are variable.

17. A graphic processing method as claimed in claim 15, comprising the further step of storing said pixel data in a display storage area of said memory, and having said memory store at least one program in a main memory storage area, wherein said display storage area and said main memory storage area are provided integrally in said memory.

* * * * *